*Claus Van Haagen,*
*Improved Planing Mechanism.*

108305  PATENTED OCT 11 1870

Witnesses: Jno. B. Harding. John Parker.

C. Van Haagen
By his Attys
Howson & Son

United States Patent Office.

CLAUS VAN HAAGEN, OF PHILADELPHIA, PENNSYLVANIA, ASSIGNOR TO HIMSELF AND ANTHONY VAN HAAGEN, OF SAME PLACE.

Letters Patent No. 108,305, dated October 11, 1870.

IMPROVEMENT IN PLANING MECHANISMS.

The Schedule referred to in these Letters Patent and making part of the same

I, CLAUS VAN HAAGEN, of Philadelphia, county of Philadelphia and State of Pennsylvania, have invented certain Improved Planing Mechanism, of which the following is a specification.

Nature and Objects of the Invention.

My invention consists of mechanism too fully described hereafter to need preliminary explanation, for planing surfaces of metal, &c.; the main object of my invention being the production of a simple, efficient, readily adjustable, and comparatively cheap tool for that purpose.

Description of the Accompanying Drawing.

Figure 1:
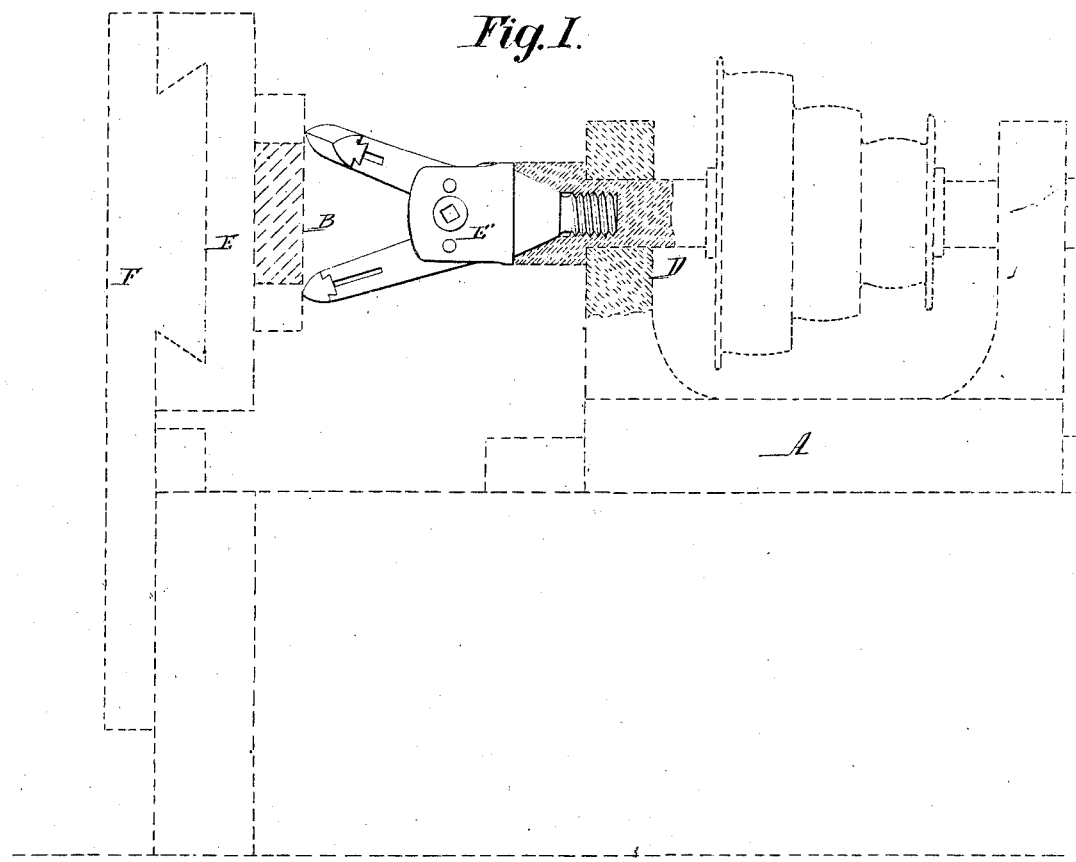
Figure 2:
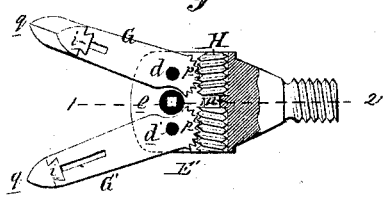
Figure 3:
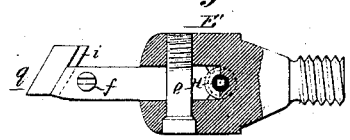

Figure 1 is a side view of my improved planing mechanism;

Figure 2, a sectional view, illustrating the peculiar construction of the adjustable cutters;

Figure 3, a section of fig. 2 on the line 1 2; and

Figure 4:
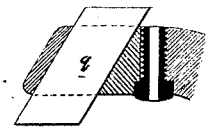

Figure 4, an enlarged sectional view, illustrating a modified plan of securing the cutting-tools to the adjustable arms.

General Description.

In fig. 1—

A represents a head-stock, similar to that of an ordinary lathe, and carrying a revolving spindle, D, the head-stock being, in the present instance, adjustable longitudinally only on suitable ways.

B is the object to be planed, and is secured by any suitable appliances to a slide, E, which can be moved in one direction only on ways on a slide, F, which can also be moved in one direction only, and that at right angles to the direction in which the slide E can be moved; in fact, the arrangement of slides for carrying the object to be planed is similar to that of ordinary slide-rests.

A hub, E', is so secured to the spindle D as to be readily detached therefrom, and within a slot in this hub are jointed two arms, G and G', by pins $d$ $d'$, between which is a pin, $e$, having a head at one end, bearing against one-half of the slotted hub, and a screw-thread at the opposite end, adapted to an internal thread in the opposite side of the hub, so that on screwing this pin tight, the two halves of the hub which possess a slight elasticity, will firmly grip the arms G and G'.

On each of these arms is formed a toothed segment, $p$, the teeth of one arm being adapted to one thread, and the teeth of the other arm to the other thread of the duplex screw or worm H, one of these threads being right and the other left-handed, so that on turning the screw in one direction, the arms will simultaneously turn on their pins apart from each other, and, on turning the screw in a contrary direction, the arms will turn toward each other.

The worm is so adapted to the end of the slot as to turn freely therein, and is confined laterally between the same and the segments of the arms, while it is retained longitudinally by a projection, $m$, on the end of the slot in the hub, adapted to a groove formed in the screw between the two worms, as shown in fig. 2.

In figs. 2 and 3, the cutters $q$ are secured to the arms in the following manner:

Each cutter is of a triangular sectional form, and has a dovetailed rib, $i$, on one of its flat sides, this rib being adapted to a dovetailed recess in the slotted end of the arm, and the latter being provided with a set-screw, $f$, by tightening which the said slotted end of the arm may be made to grip the dovetailed rib of the cutters, and thus secure the same after adjustment.

Another mode of securing the cutter to the arm is illustrated in fig. 4.

This plan, however, has been so fully described on a separate application which I have made for a patent for boring and turning mechanism, that an explanation of it here will be unnecessary.

As the hub with its arms revolves, the slide E, with the object B, is caused to traverse so that the object must be planed by the cutters, which may be fed forward to suit the required depth of cut by moving the cross-head A, although the cut may be varied to a limited extent by adjusting the arms nearer to or further from each other without disturbing the head-stock.

If a narrow object has to be planed, the arms may be so arranged as to just sweep past the edges of the object, and the cutters may revolve rapidly, but if a wide object has to be planed, the cutters may be adjusted a corresponding distance apart from each other, and they may revolve at a slower speed; in other words, the speed of the cutters should be commensurate with the width of the object to be planed.

I have referred to the head-stock A as being movable, so as to feed the cutters toward the object to be planed; but it is evident that the head-stock may be stationary, and the spindle revolve in fixed bearings, and that the slides, which carry the object to be planed, may be so arranged that they can be moved toward the cutters, or the head-stock may be arranged to traverse on slides like those of a slide-rest, as the spindle and cutters revolve, the object to be planed being, in this case, stationary.

Claims.

The two arms, G and G', with their toothed segments and pins $d$ $d'$, and the right and left-handed worm H, the whole being combined and adapted to the slotted hub E', substantially as described.

In testimony whereof I have signed my name to this specification in the presence of two subscribing witnesses.

CLAUS VAN HAAGEN.

Witnesses:
FRANK B. RICHARDS,
HARRY SMITH.